United States Patent [19]

Mizuno et al.

[11] Patent Number: 4,485,292
[45] Date of Patent: Nov. 27, 1984

[54] ARC BLOWING CONTROL METHOD AND APPARATUS FOR PULSE ARC WELDING

[75] Inventors: Masanori Mizuno; Motoe Kitani, both of Aichi, Japan

[73] Assignee: Mitsubishi Denki Kabushiki Kaisha, Tokyo, Japan

[21] Appl. No.: 548,756

[22] Filed: Nov. 4, 1983

[30] Foreign Application Priority Data

Nov. 5, 1982 [JP] Japan .......................... 57-167712[U]
Nov. 5, 1982 [JP] Japan .................................. 57-194322

[51] Int. Cl.³ ............................................. B23K 9/09
[52] U.S. Cl. ............................... 219/123; 219/130.51; 219/137 PS
[58] Field of Search ............. 219/123, 130.51, 137 PS, 219/130.31

[56] References Cited

U.S. PATENT DOCUMENTS 3,626,145 12/1971 Jackson ................................ 219/123
4,301,355 11/1981 Kimbrough et al. .......... 219/137.71

Primary Examiner—C. C. Shaw
Attorney, Agent, or Firm—Sughrue, Mion, Zinn, Macpeak & Seas

[57] ABSTRACT

An arc blowing control method and apparatus for use in a pulse arc welding system for preventing the extinction of the welding arc in the presence of current fluctuations or the like, thus preventing splattering of molten welding material and resulting in a smooth and continuous welding bead. A detection circuit is provided for electrically detecting the occurrence of a so-called stepped leader phenomenon during pulse arc welding and for generating a stepped leader signal accordingly. A switching unit is operated in response to the stepped leader signal for switching from a normal arc signal output to an arc blowing blocking signal output for a predetermined time. An arc blowing blocking circuit operates in response to the arc blowing blocking signal for effecting arc blowing suppression operations.

9 Claims, 14 Drawing Figures

FIG. 1   FIG. 2   FIG. 3
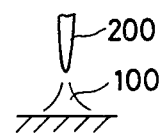
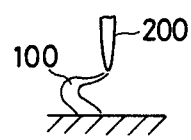
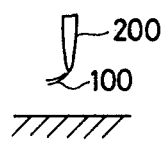
FIG. 4
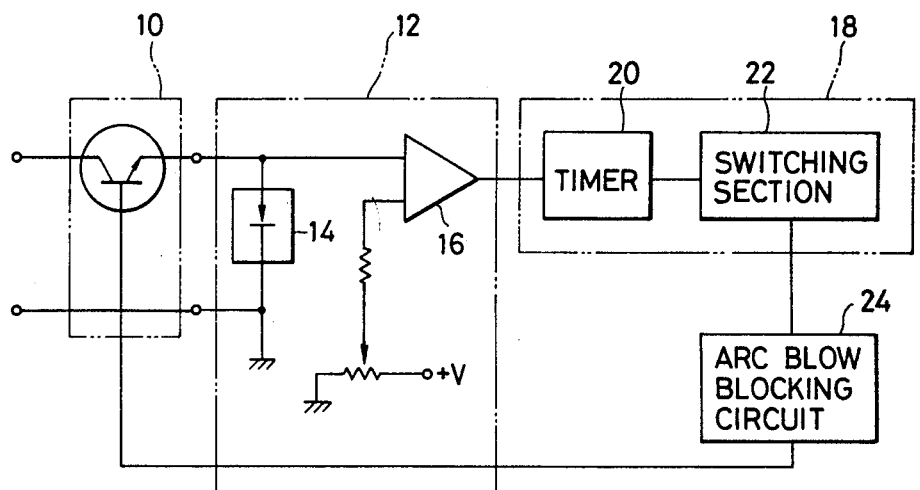

WELDING CURRENT

ARC BLOWING CONTROL METHOD AND APPARATUS FOR PULSE ARC WELDING

BACKGROUND OF THE INVENTION

The present invention relates to an arc blowing control method and apparatus used in a pulse arc welding process. More particularly, the invention relates to a method and an apparatus for controlling arc blowing in the pulse arc welding process, specifically, to suppress arc blowing in such a process.

Pulse arc welding is a process of binding and fixing a workpiece to a metal base by supplying an arc pulse current to an arc welding wire or rod, causing arc discharge to take place between the arc welding wire or rod and the base, and melting the arc welding wire or rod upon the base by means of heat generated during arcing. Pulse arc welding is easy in operation and produces superior bonding and, accordingly, is widely utilized in various manufacturing operations.

However, such pulse arc welding has a drawback in that, owing to fluctuations of the arc current and the like, a magnetic blowing of the arc may occur, thereby resulting in inferior welding.

More specifically, if the arc becomes weak due to a decrease in the arc current caused by fluctuation of the pulse arc current, the weakened arc can be bent by an attractive magnetic force towards the workpiece. The arc 100, as shown in FIGS. 1 to 3, changes from its normal state shown in FIG. 1 to an abnormal state shown in FIG. 2. This latter state results in the generation of what is termed arc blowing, specifically, magnetic arc blowing. As this magnetic blowing advances further, the arc 100 disappears, as shown in FIG. 3. At this time, molten material from the arc welding wire 200 may splatter. Further, the welding bead will be disturbed, thereby resulting in inferior welding.

SUMMARY OF THE INVENTION

The present invention was achieved in view of the foregoing problems in the prior art. A specific object thereof is to provide an arc blowing control method and apparatus for pulse arc welding which functions to detect the presence of arc blowing before it becomes serious and to suppress generation of the arc blowing, thereby to provide very smooth pulse arc welding.

Achieving the object above, the apparatus according to the invention includes a detection circuit for detecting electrically a "stepped leader" phenomenon occurring during the pulse arc welding process and providing a stepped leader signal accordingly, a switch unit operated in response to the stepped leader signal for switching from a normal arc signal output to an arc blowing blocking signal output for a certain interval, and an arc blowing blocking circuit operable in response to the arc blowing blocking signal for effecting an arc blowing suppression operation.

This invention further provides a novel method of suppressing generation of arc blowing which includes the steps of detecting electrically the occurrence of the stepped leader phenomenon during pulse arc welding, and increasing a base current of a pulse arc current or shortening temporarily the base interval of the pulse arc current in response to the detected presence of the stepped leader phenomenon.

BRIEF DESCRIPTION OF THE DRAWINGS

FIG. 1 is an explanatory view showing a normal arc welding state in pulse arc welding;

FIGS. 2 and 3 are explanatory views illustrating the arc blowing phenomena in pulse arc welding;

FIG. 4 is a block diagram showing an arc blowing control apparatus for pulse arc welding according to the invention;

DESCRIPTION OF THE PREFERRED EMBODIMENTS

Preferred embodiments of the invention will now be described with reference to the drawings.

FIG. 4 shows an arc blowing control apparatus for pulse arc welding according to the invention. In the apparatus of FIG. 4, an output end of an arc current supply circuit 10, including a transistor for control of arc welding, is connected to a detection circuit 12 for detecting electrically the occurrence of the stepped leader phenomenon. The detection circuit 12 includes an arc voltage detector 14 for detecting the pulse arc voltage, and a comparator 16 for comparing the arc voltage detected by the arc voltage detector 14 with a predetermined reference value and for providing a stepped leader signal when the arc voltage exceeds the reference value. With this detection circuit, abnormalities of the arc voltage, that is, the stepped leader phenomenon, can be accurately detected.

Figure 5:
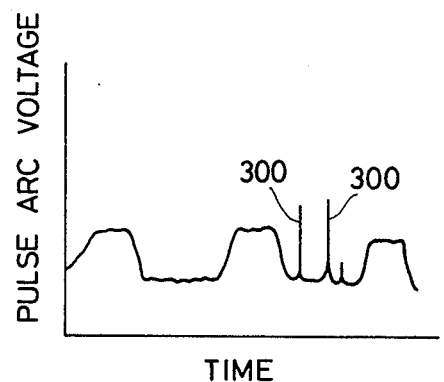
FIG. 5 is a waveform diagram of a pulse arc voltage exhibiting the stepped leader phenomenon during a pulse arc welding process.

In more detail, it is known that arc blowing occurs when an abnormal voltage, typically a voltage spike 300 as shown in FIG. 5, appears in the pulse arc voltage waveform. Therefore, it is possible to effectively suppress arc blowing by detecting this abnormal voltage, (the stepped leader phenomenon) and by effecting arc blowing suppression in response.

In this embodiment, the stepped leader signal produced at the output of the comparator 16 is applied to a switch unit 18 where it is processed. Here, this switch unit 18 is composed of a timer 20 responsive to the stepped leader signal and for providing an output for a certain interval in response thereto, and a switching section 22 responsive to the timer output signal for providing an arc blowing suppression instruction signal. The switching section 22 provides a normal arc signal during normal conditions, that is, in the normal welding process where no abnormality appears in the arc voltage, and switches its output from the normal arc signal output state to the arc blowing blocking signal output state for effecting an arc blowing blocking operation when the stepped leader phenomenon is indicated in the arc voltage, that is, when a timing signal is received from the timer 20. This arc blowing blocking signal is applied to an arc blowing blocking circuit 24 with which an arc blowing operation is performed.

Figure 6:
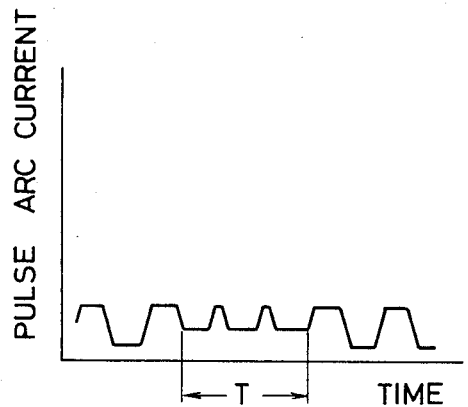
FIG. 6 is a waveform diagram of an arc current providing arc blowing control or suppression in accordance with a first embodiment of the invention.

The arc blowing suppression operation can be realized by several types of arc blowing blocking circuits. In the first embodiment, the arc blowing blocking circuit 24 in implemented with a circuit which functions to increase the welding base current in response to the arc blowing blocking signal. The increase in the base current is effective only for a time interval instructed by the timer 20. This interval is indicated by T in FIG. 6.

Accordingly, because the arc is strengthened in response to the increase of the base current, the arc cannot be deflected by the magnetic attractive force of the workpiece, and hence arc blowing is effectively suppressed. However, on account of the increase in the base current, the average current during the interval T increases, thereby increasing the rate at which the wire is melted and thus increasing the welding bead width. Hence, were it not compensated for in the manner to be described the bead width would fluctuate due to arc blowing suppression.

In order to eliminate the foregoing drawback, in this first embodiment current control is provided to narrow the pulse width of the pulse arc current during the interval T. Therefore, in this embodiment, the mean value of the arc current during the interval T in which the magnetic force is present is made equal to the average current value in the normal state, and hence the welding bead width does not fluctuate while arc blowing is effectively suppressed.

Figure 7:
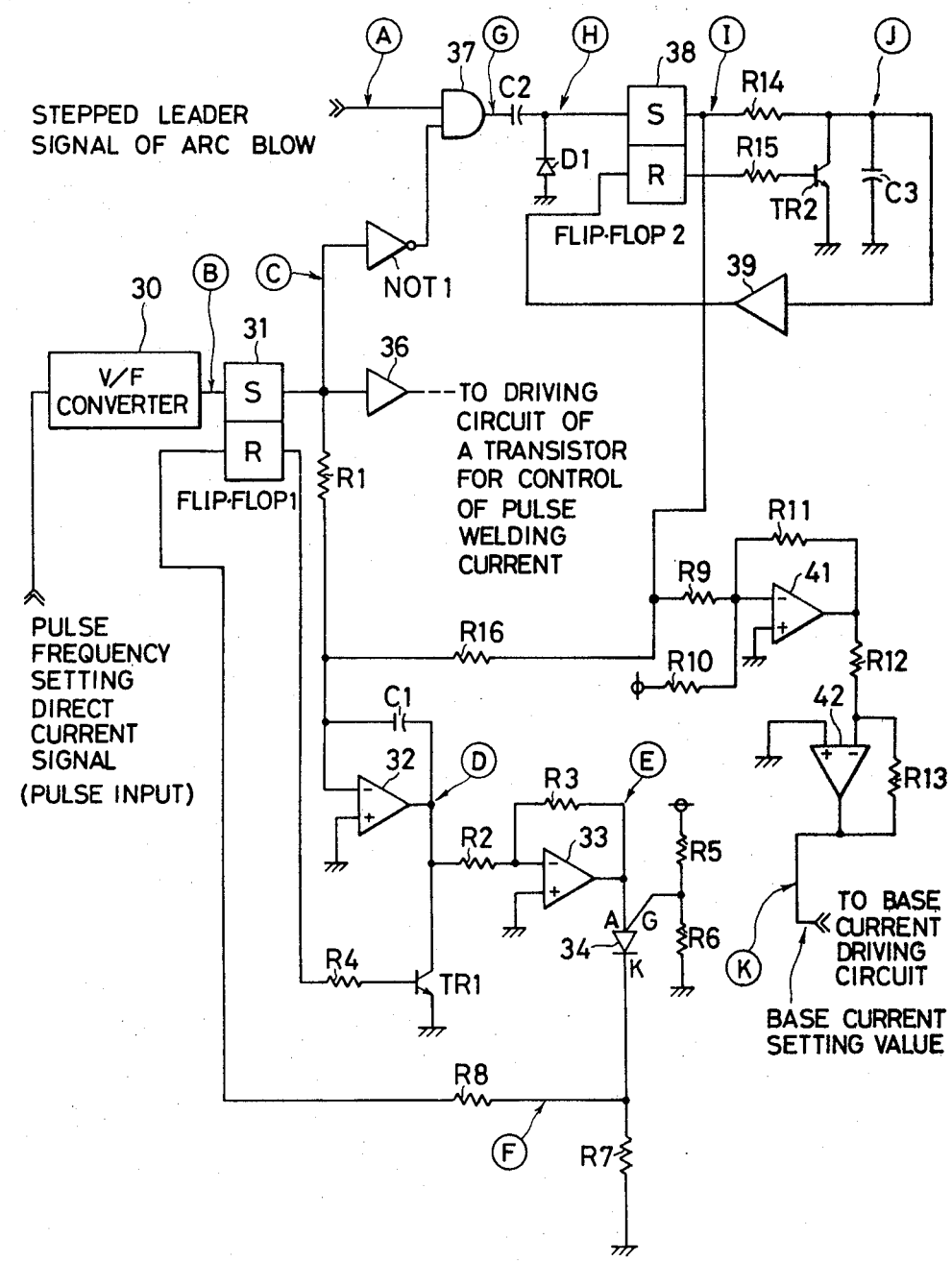
FIGS. 7 9A, 10A and 11A are schematic diagrams showing several embodiments of an arc blowing blocking circuit employable in an arc blowing control apparatus of this invention.
Figure 8:
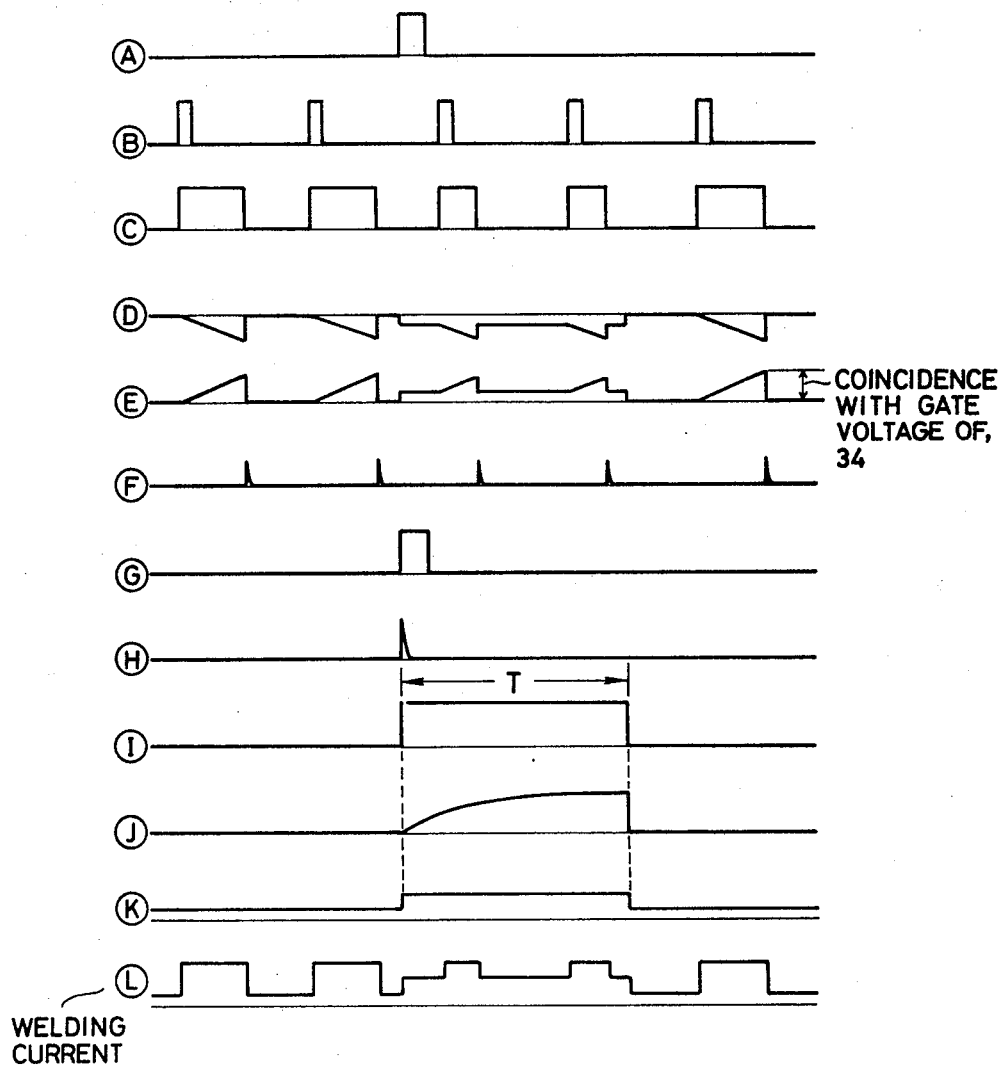
FIGS. 8, 9B, 10B and 11B are waveform diagrams corresponding to the circuit of FIGS. 7, 9A, 10A and 11A, respectively.

FIG. 7 is a schematic diagram showing a control circuit constructed in accordance with the invention, and FIG. 8 is a waveform diagram corresponding thereto. In response to an input pulse frequency setting direct-current signal, a V/F converter 30 generates a pulse signal (B) having a frequency determined by the direct-current signal. This pulse sets a flip-flop 31, the S (set) output of which is applied to an operational amplifier 32, the output of which is a ramp-like signal (D). The signal D is phase inverted by an operational amplifier 33 and applied to the anode of an N-gate thyristor 34. When the anode voltage of the thyristor 34 becomes higher than its gate voltage, the thyristor 34 fires and generates a pulse (F) at its cathode. This pulse (F) is inputted to a reset terminal of the flip-flop 31, setting the S output to "0". As a result, the S output of the flip-flop 31 has the form of a pulse train (C) having pulse of a controlled width. The output of the flip-flop 31 is applied to a buffer 36, the output of which in turn drives a transistor which controls the pulse welding current.

In the foregoing state, if the stepped leader signal (A) is generated during the base interval, upon the output (G) of an AND gate changing states, a pulse (H) is applied to the S input of a flip-flop 38. As a result, the S output (I) of the flip-flop 38 becomes an "H" level, and thereby a capacitor C3 is charged, as indicated by waveform (J). After a certain time interval T, the output of a buffer 39 goes to the "H" level and, as a result, the flip-flop 38 is reset. Thus, the S output of the flip-flop 38 is a pulsed signal (I) having a pulse duration T. Only during this interval T will the output (K) of the series-connected operational amplifiers 41 and 42 rise above its quiescent level. Accordingly, by employing the output of the operational amplifier 42 as the base current setting signal, the base current will be increased only during the interval T, that is, after receiving the stepped leader signal indicative of imminent arc blowing.

Further, by applying the output of the flip-flop 38 to the operational amplifier 32 through a resistor R16, the output of the operational amplifier will rise only during the interval T. As a result, the output of the operational amplifier 33 also only rises during the time interval T, and thus the time interval during which the anode voltage of the N-gate thyristor 34 is higher than its gate voltage is short. Therefore, the S output (C) of the flip-flop 31 becomes narrow width pulses during the time interval T after occurrence of the stepped leader signal. Consequently, the pulse welding current then has a narrow width. Accordingly, during the time interval T after generation of the stepped leader signal, the welding current (L) is supplied to the arc welding station with a levelboosted base current and narrowed pulse width.

Other embodiments of the invention are shown in FIGS. 9 to 11. These embodiments suppress generation of arc blowing by detecting electrically occurrence of the stepped leader phenomenon during the pulse arc welding process, and, in response, shortening temporarily the base interval of the pulse arc current.

The operation of temporarily shortening can be realized in several ways. FIG. 9 shows an example where a single pulse 400 having a very narrow pulse width is supplied in a base interval to increase momentarily the pulse current, thereby to temporarily boost the arcing power. FIG. 10 shows an example where a high frequency pulse current 402 is supplied in the base interval to shorten the base interval. Finally, FIG. 11 shows an example where, for a certain interval until the stepped leader phenomenon disappears, the frequency of the pulse arc current is increased to thus shorten the base current interval from L to $L_1$, thereby eliminating any possibility of arc blowing. These embodiments will be described in detail herein after.

Figure 9A:
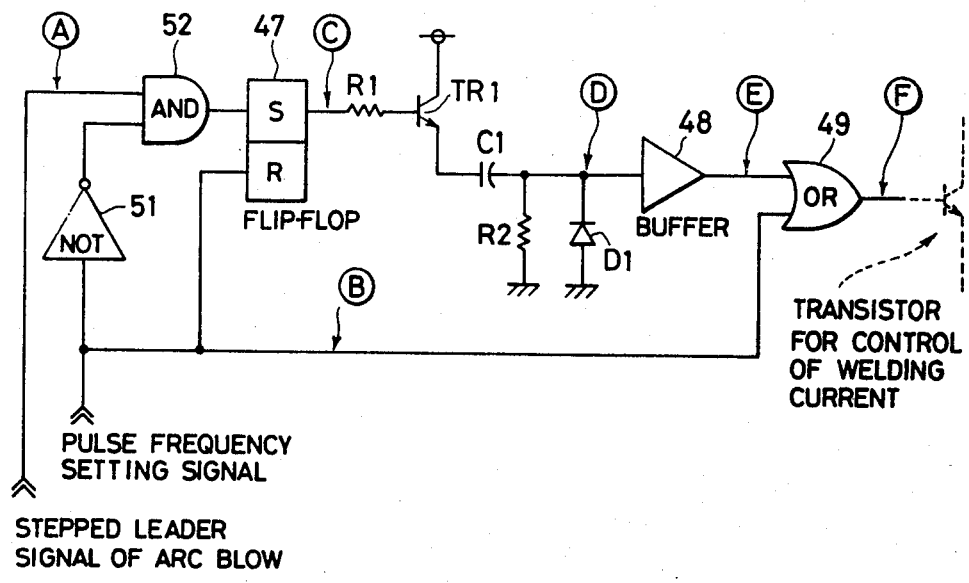
Figure 9B:
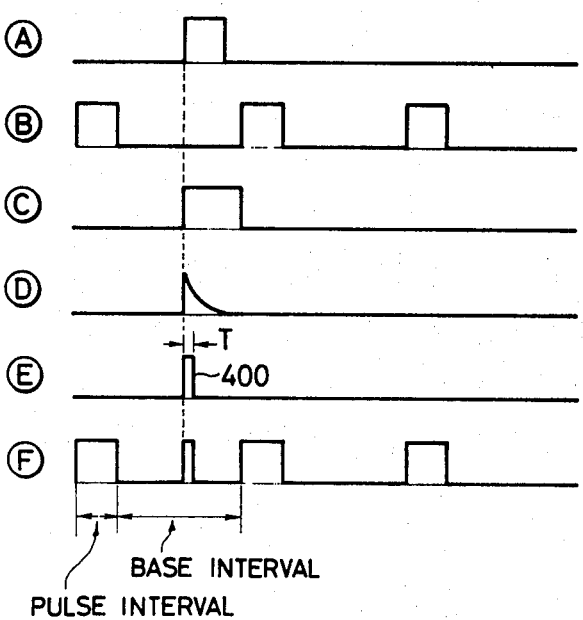

With response to FIGS. 9A and 9B, if the stepped leader signal (A) is generated when a pulse of the frequency setting signal (B), applied through an inverter 51, in the base interval, a signal is inputted to the S input terminal of a flip-flop 47 via an AND gate 52, whereupon the flip-flop output (C) changes to the "H" level. Thus, at that time, a transistor TR1 is driven through a resistor R1, causing a capacitor C1 to be charged rapidly. As a result, the waveform of the voltage at the cathode of a diode D1 is as shown at (D). Waveform (E) is the result of wave shaping the signal (D) with a buffer 48. The time width T of the signal (E) is determined by the values of the capacitor C1 and resistor R2. By passing the signals (E) and (B) through an OR gate 49, the signal (F) is obtained, which in turn is applied to actuate a transistor which controls the welding current. Thus, a welding current having a waveform similar to (F) is obtained.

Figure 10A:
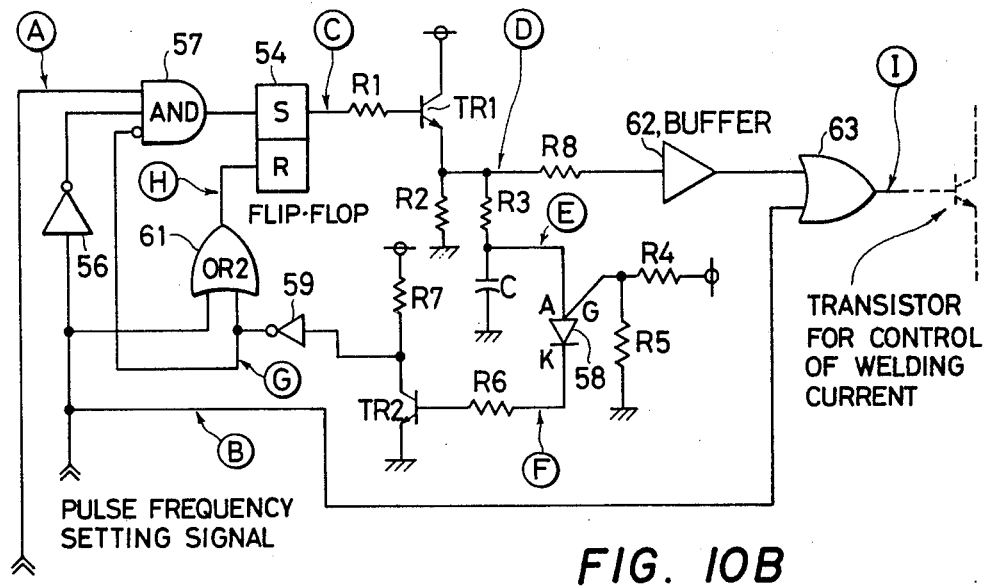
Figure 10B:
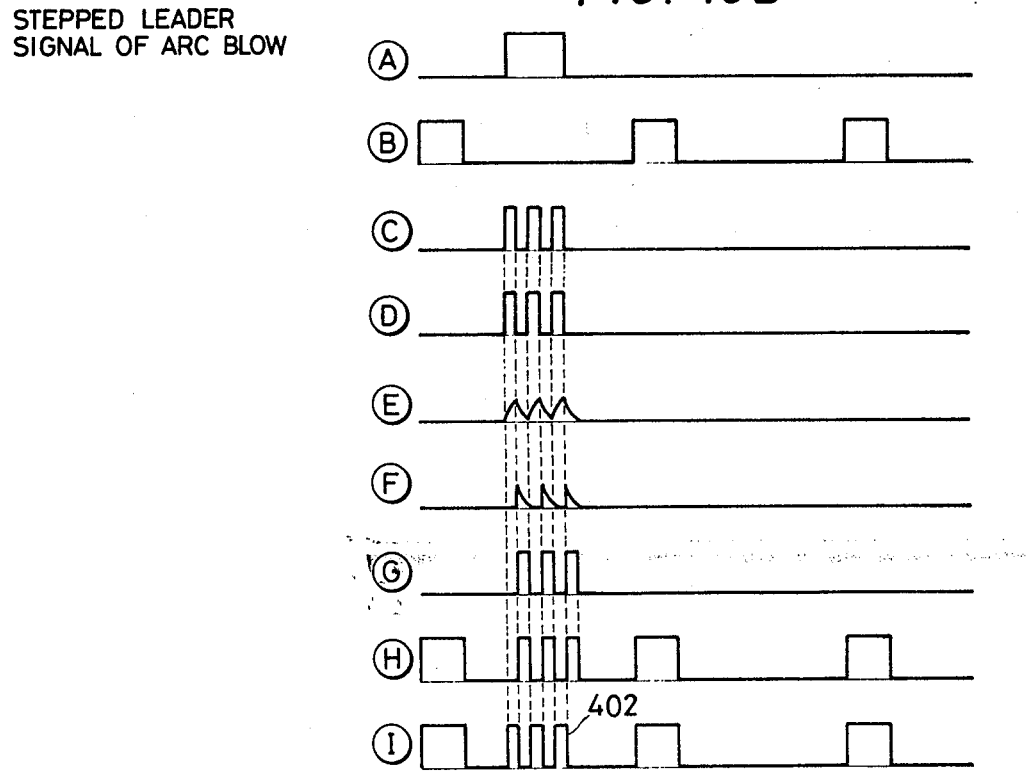

In FIGS. 10A and 10B, if the stepped leader signal (A) is generated when a pulse of the frequency setting signal (B) occurs in the base interval, a signal is inputted to the S input terminal of a flip-flop 54, via an inverter 56 and AND gate 57, whereupon the flip-flop output (C) goes to the "H" level. At this time, a transistor TR1 is driven through a resistor R1. As a result, a capacitor C is charged through a resistor R3 and the terminal voltage (E) thereof rises. When this rising voltage becomes higher than the gate G voltage of an N-gate thyristor 58, the thyristor 58 fires, as shown at F, and, as a result, a transistor TR2 is driven through a resistor R6. Thus, at this time, the output of an inverter 59 becomes an "H" level, as indicated by waveform (G). Accordingly, the flip flop 54 is reset, via an OR gate 61, and its output changed to the "L" level. Subsequently, the voltage across the capacitor C is lowered and, when it nears zero, firing of the thyristor 58 terminates and the output of inverter 59 changes to the "L" level. At that moment, if the stepped leader signal is still present, the flip-flop 54 output again is set to the "H" level and the foregoing operation is repeated. That is, while the stepped leader signal is present, a repetitive sequence of pulses is generated, as indicated by waveform (D). As a result, a transistor which controls the welding current is driven, via a buffer 62 and OR gate 63, by a signal (I), and a welding current waveform similar to (I) is produced.

Figure 11A:
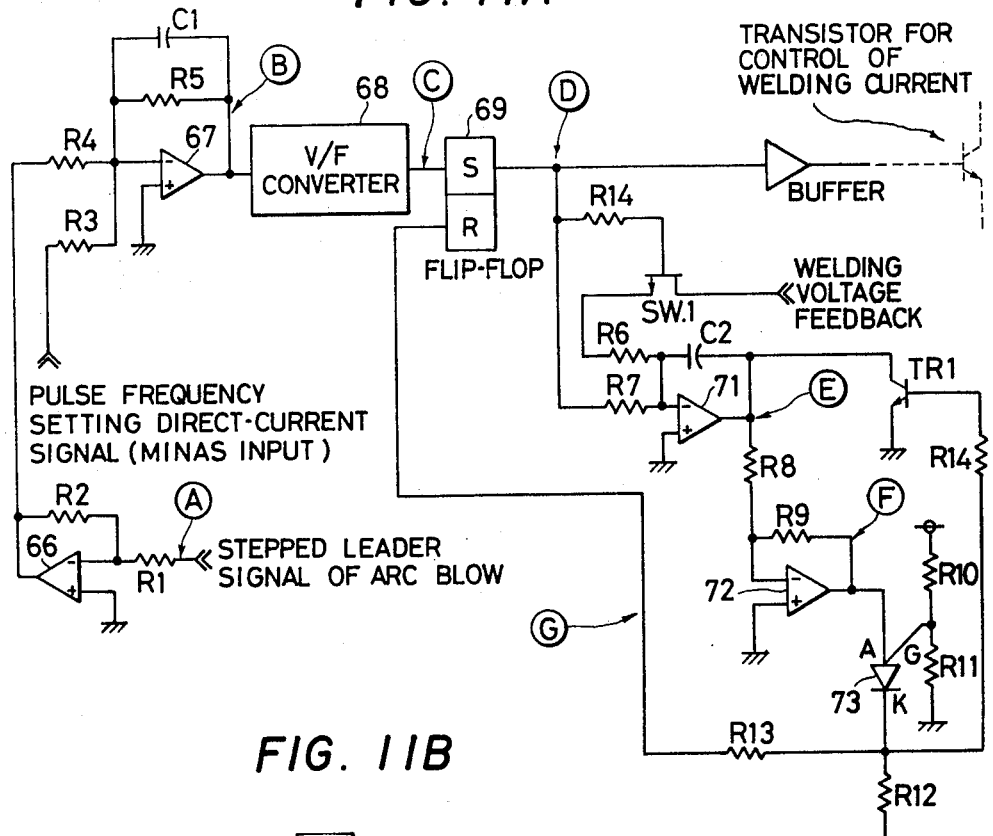
Figure 11B:
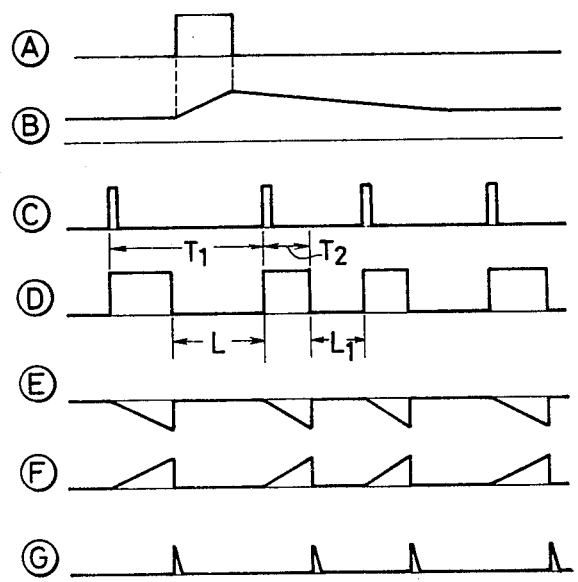

With reference to FIGS. 11A and 11B, the stepped leader signal (A) is phase inverted by an operational amplifier and inputted to an operational amplifier 15 through a resistor R4. The pulse frequency setting direct-current signal is also inputted to the operational amplifier 67 through a resistor R3. The output signal from the operational amplifier 67 has a waveform (B) which is the result of additional integration of the two inputs. This output is changed by a V/F converter 68 into a pulse signal having a waveform (C). As a result, the pulses generated for a certain interval after the appearance of the stepped leader signal (A) are shortened.

The output (C) of the V/F converter 68 is applied to an S terminal of a flip-flop 69. The output (D) of the flip-flop becomes an "H" level each time the pulse output from the V/F converter 68 appears. This flip-flop output is integrated by an operational amplifier 71 and capacitor C2. The flip-flop output is used to activate an analog switch SW1 through a resistor R14. As a result, a welding feedback voltage is also integrated by the operational amplifier 71 through the analog switch SW1 and a resistor R6. This functions to narrow a pulse width T2 when a pulse period T1 becomes short, thereby to maintain constant the mean value of the welding voltage.

The output (E) of the operational amplifier 71 is phase inverted by an operational amplifier 72, and the resulting signal applied to an anode of an N-gate thyristor 73. When the anode voltage of the thyristor 73 becomes higher than its gate voltage, the thyristor 73 fires and applies a reset signal (G) to the R (reset) terminal of the flip-flop 69 through a resistor R13. As a result, the output of the flip-flop goes to the "L" state, resulting in a pulse of a desired width being generated. In this arrangement, a transistor TR1 functions to discharge rapidly the charge of a capacitor C2 at the time of firing of the thyristor 73. In this way, the signal shown at (D) is obtained and used to drive the transistor which controls the welding current. Accordingly, a welding current having a waveform similar to (D) is obtained.

We claim:

1. An arc blowing control apparatus for pulse arc welding comprising: an arc current supply circuit including arc current control means; a detection circuit connected to an output of said arc current supply circuit for detecting electrically a stepped leader phenomenon and providing, when said stepped leader phenomenon is detected, a stepped leader signal; a switch unit operating in response to said stepped leader signal from said detection circuit for switching an output from a normal arc signal output to an arc blowing blocking signal output; and an arc blowing blocking circuit operating in response to the arc blowing blocking signal output from said switch unit for effecting an arc blowing suppression operation.

2. The arc blowing control apparatus for pulse arc welding as claimed in claim 1, wherein said detection circuit comprises an arc voltage detector for detecting a pulse arc voltage, and a comparator for comparing the arc voltage detected by said arc voltage detector with a predetermined reference value.

3. The arc blowing control apparatus for pulse arc welding as claimed in claim 1, wherein said switch unit comprises a timer operating in response to said stepped leader signal for providing an output for a predetermined interval in response thereto; and a switching section operating in response to said output from said timer.

4. An arc blowing control method for pulse arc welding wherein the improvement comprises suppressing the generation of arc blowing by the steps of: electrically detecting the occurrence of a stepped leader phenomenon during a pulse arc welding process; and increasing a base current of a pulse arc current when said stepped leader phenomenon occurs.

5. An arc blowing control method for pulse arc welding wherein the improvement comprises suppressing the generation of arc blowing by the steps of electrically detecting the occurrence of a stepped leader phenomenon during a pulse arc welding process, and shortening temporarily a base interval of a pulse arc currnt when said stepped leader phenomenon occurs.

6. The arc blowing control method for pulse arc welding as claimed in claim 5, wherein said step of shortening temporarily the base interval is effected by supplying a single pulse of current of a very small pulse width during the base interval.

7. The arc blowing control method for pulse arc welding as claimed in claim 5, wherein said step of shortening temporarily the base interval is effected by supplying a high frequency pulse current during the base interval.

8. The arc blow control method for pulse arc welding as claimed in claim 5, wherein said step of shortening temporarily the base interval is effected by increasing a pulse frequency of the pulse current for a predetermined time interval.

9. An arc blowing control method for pulse arc welding wherein the improvement comprises suppressing the generation of arc blowing by the steps of: electrically detecting the occurrence of a stepped leader phenomenon during a pulse arc welding process; and narrowing a space between an arc welding wire and a base metal when said stepped leader phenomenon occurs.

* * * * *